United States Patent

[11] 3,607,875

| [72] | Inventors | Gordon R. Miller;<br>James C. Renfro, both of Lake Jackson, Tex. |
|---|---|---|
| [21] | Appl. No. | 831,214 |
| [22] | Filed | June 6, 1969 |
| [45] | Patented | Sept. 21, 1971 |
| [73] | Assignee | Dow Chemical Company<br>Midland, Mich. |

[54] METHOD OF PREPARING N,N-DIMETHYLPIPERAZINIUM HALIDE
6 Claims, No Drawings

[52] U.S. Cl. .................................................. 260/268 SY,
260/268 C, 260/268 R, 260/652 R
[51] Int. Cl. .................................................. C07d 51/70

[50] Field of Search ..................................... 260/268 SY

[56] References Cited
UNITED STATES PATENTS

| 2,267,686 | 12/1941 | Kyrides .................. | 260/268 SY |
| 3,239,528 | 3/1966 | Von Bebenburg et al. ... | 260/268 SY |
| 3,359,270 | 12/1967 | Dick ....................... | 260/268 SY |

FOREIGN PATENTS

| 695,217 | 8/1940 | Germany .................. | 260/268 SY |

Primary Examiner—Donlad G. Daus
Attorneys—Griswold & Burdick and C. E. Rehberg

ABSTRACT: N,N-Dimethylpiperazinium halide is prepared in a novel reaction which comprises reacting by contacting N,N-dimethylethylenediamine with 1,2-dihaloethane.

METHOD OF PREPARING N,N-DIMETHYLPIPERAZINIUM HALIDE

BACKGROUND OF THE INVENTION

N,N-Dimethylpiperazinium halide is a known compound having the structural formula

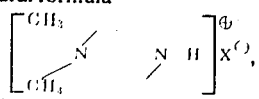

wherein X is chloro, bromo or iodo.

Previous methods of preparing this and similar compounds include the methods described by (a) M. Harfenist, J. Am. Chem. Soc., 79, 2211 (1957) wherein N,N-dialkyl-N'-carbethoxypiperazinium halide is decarboxylated with heat and aqueous HCl; and by (b) O. Hromatka et al., Monatsh, 82, 880 (1951) and 83, 38 (1952) wherein N,N-dimethylpiperazinium dihalide is prepared in the reaction between bis(2-chloroethyl)ammonium chloride and dimethylamine.

A general reaction between N,N-dialkylalkylenediamines and alkylene dihalides having two to three carbon atoms is taught by J. O. VanHook et al. in U.S. Pat. No. 2,675,387. VanHook's reaction has similar process conditions; but his products were substantially linear.

SUMMARY OF THE INVENTION

It has now been discovered that N,N-dimethylepiperazinium halide is prepared in high yield and purity in the novel one-step process which comprises reacting by contacting N,N-dimethylethylenediamine with an ethylene dihalide, wherein the halogen is chlorine, bromine or iodine. The novel reaction is preferentially carried out under substantially anhydrous conditions.

Suitable ethylene dihalide reactants in this process are ethylene dichloride, ethylene dibromide, ethylene diiodide, 1-bromo-2-chloroethylene, 1-bromo--iodoethane -Iodoethane and 1-chloro-2iodoethane. The preferred reactant is ethylene dichloride or ethylene dibromide.

The reaction temperature is typically selected between about 25° and about 120° C. At temperatures below 25° C., the reaction rate is quite low, and at temperatures above about 120° C., the reaction rate is quite high are pressurized apparatus is generally necessary to contain the reaction mixture.

The reaction is not critical. Atmospheric pressure is convenient and, therefore, preferred; but subatmospheric and superatmospheric may be used so long as the reactants are kept in the liquid state.

The ratio of reactants is likewise not critical. If ethylene dihalide is used in stoichiometric excess, the product will be N,N-dimethylpiperazinium halide hydrohalide, which is easily converted to the subject compound by neutralization of the salt with aqueous caustic. If N,N-dimethylethylenediamine is used in excess of about 2 moles per mole of ethylene dihalide, the N,N-dimethylpiperazinium halide is formed. Typically, an excess of diamine reactant is preferred.

The reaction product is easily separated from the substantially anhydrous reaction mixture by filtration. Water may be tolerated in the reaction to a greater or lesser degree but the reaction product is hygroscopic and separation by filtration then becomes increasingly difficult with increasing amounts of water. Substantially anhydrous reaction conditions are therefore preferred.

SPECIFIC EMBODIMENT

The following example further illustrates the invention:

PREPARATION OF N,N-DIMETHYLPIPERAZINIUM CHLORIDE

A 2-liter, round-bottom flask was charged with 881.5 g. (10 moles) of N,N-dimethylaminoethylamine. The flask was equipped with a reflux condenser, stirrer, and thermometer. To this, 118.8 g. (1.2 moles) of ethylene dichloride was added. The temperature of the reaction mixture was raised to 86° C. and maintained for three hours under a dry nitrogen atmosphere.

The reaction mixture was cooled and the white crystalline product removed by filtration. The product was then washed with benzene and dried under vacuum. 152.8 g. of product was removed (84.7 percent yield based on 100 percent conversion of ethylene dichloride) with a melting point of 221°–223° C.

Infrared and nuclear magnetic resonance analysis confirmed the structure.

We claim:
1. A process for producing N,N-dimethylpiperazinium halide comprising reacting by contacting N,N-dimethylethylenediamine with an ethylene dihalide wherein the halogen is chlorine, bromine or iodine.
2. The process defined in claim 1 wherein the halogen is chlorine or bromine.
3. The process defined in claim 1 wherein the reaction temperature is between 25° C. and 120° C.
4. The process defined in claim 1 wherein the reaction conditions are substantially anhydrous.
5. The process defined in claim 4 wherein said ethylene dihalide is ethylene dichloride or ethylene dibromide.
6. The process defined in claim 5 wherein the reaction temperature is between 25° C. and 120 C.

PO-1050
(5/69)

UNITED STATES PATENT OFFICE
CERTIFICATE OF CORRECTION

Patent No. 3,607,875          Dated 21 September 1971

Inventor(s) Gordon R. Miller and James C. Renfro

It is certified that error appears in the above-identified patent and that said Letters Patent are hereby corrected as shown below:

In column 1, please change the formula between lines 7 and 11 to:

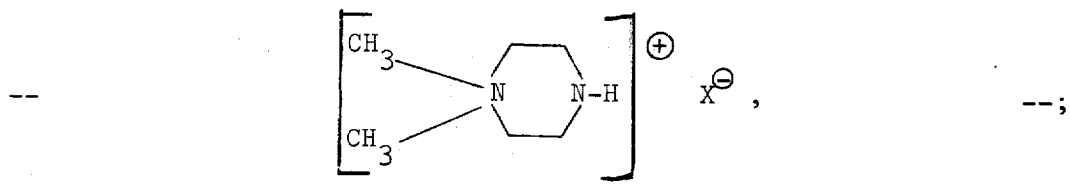

in line 37 delete "1-bromo--iodoethane -lodoethane" and insert -- 1-bromo-2-iodoethane --; in line 38 delete "2iodoethane." and insert -- 2-iodoethane. --; in line 43 delete "are" and insert -- and --.

In column 2, line 32, delete "removed" and insert -- recovered --

Signed and sealed this 16th day of May 1972.

(SEAL)
Attest:

EDWARD M. FLETCHER, JR.        ROBERT GOTTSCHALK
Attesting Officer               Commissioner of Patents